United States Patent [19]
Bruder et al.

[11] 3,730,649

[45] May 1, 1973

[54] SHIFT ELEMENT FOR GAS TURBINE FOR SHIFTING BETWEEN SERIES AND PARALLEL OPERATIONS

[75] Inventors: Werner Bruder, Neckarrems; Hubert Grieb, Stuttgart, both of Germany

[73] Assignee: Daimler-Benz Aktiengesellschaft, Stuttgart, Germany

[22] Filed: June 3, 1971

[21] Appl. No.: 149,699

[30] Foreign Application Priority Data

June 3, 1970 Germany..................P 20 27 222.4

[52] U.S. Cl..................................417/408, 417/62
[51] Int. Cl..............................................F04b 17/00
[58] Field of Search............................417/408, 62

[56] References Cited

UNITED STATES PATENTS 3,585,795  6/1971  Grieb..............................417/408 X
3,381,891  5/1968  Bellmer..............................417/62

Primary Examiner—C. J. Husar
Attorney—Craig, Antonelli & Hill

[57] ABSTRACT

A shifting element for gas turbines for shifting between series and parallel operation which is arranged concentrically between two turbo-units and is subdivided into channel sectors for the connection of the flow paths of the turbo-units with each other or for the connection of the turbo-units with an inlet and a gas discharge; the shifting element consists of at least two mutually rotatable parts arranged one behind the other, of which the forward part is provided with a gas inlet and with a connection to the gas outlet of the upstream turbo-unit while the rear part is provided with a connection to the gas inlet of the downstream turbo-unit and with a gas outlet.

32 Claims, 5 Drawing Figures

Patented May 1, 1973

INVENTORS
WERNER BRUDER
HUBERT GRIEB

BY Craig, Antonelli & Hill

ATTORNEYS

INVENTORS
WERNER BRUDER
HUBERT GRIEB

BY Craig, Antonelli & Hill
ATTORNEYS

SHIFT ELEMENT FOR GAS TURBINE FOR SHIFTING BETWEEN SERIES AND PARALLEL OPERATIONS

The present invention relates to a shifting element for gas turbines for the shifting between series and parallel operation, which is concentrically arranged between two turbo-apparatus and is subdivided into channel or duct sectors for the connection of the flow paths of the turbo apparatus with each other or for the connection of the turbo-apparatus with an inlet and a gas discharge or outlet.

Such types of shifting elements are required in gas turbines, especially for vehicle drives, both between the low pressure compressor and the high pressure compressor as also between the compressor turbine and the working or output turbine in order that above all in the lower rotational speed range and lower output range a favorable fuel consumption is obtained. In the series operation, the shifting elements are to connect the turbo-units or aggregates in such a manner that the gas flow passes through the turbo units in series, i.e., through one after the other. In the parallel operation, each turbo aggregate is to operate by itself, i.e., both compressors are to draw in the air directly from the atmosphere and are to pass on the compressed air directly to the heat-exchanger whereas simultaneously both the compressor turbine as also the output turbine are to be supplied directly with hot gases from the combustion chamber and the hot gases are then to be conducted directly from the respective turbine to the heat exchanger.

A shifting element has been proposed already in the prior art which is constructed unitary, i.e., in one piece and rotatable, and in which the air or gas conduction is so arranged that during series operation a smooth passage through the sector-shaped channels from the upstream to the downstream turbo unit takes place. For the parallel operation, channels or ducts arranged offset are placed into operation which are arranged one behind the other and are each composed of a radial and an axial portion. The proposed shifting element of the prior art, however, requires an arrangement of the inlet and outlet housing which—as viewed in the axial direction—represents an unfavorable sequence since alternately inlet-outlet-inlet-outlet are arranged in the parallel operation so that a favorable connection from the preceding or to the following structural groups such as inlet filter, heat-exchanger, combustion chamber or the like are realizable only with great difficulties.

The present invention is concerned with the task to avoid these disadvantages. The present invention essentially consists in that the shifting element consists of at least two mutually rotatable parts disposed one behind the other, of which the upstream or forward part is provided with a gas inlet and with a connection to the gas discharge or outlet of the upstream-connected turbo-unit and the downstream or rear part is provided with a connection to the gas inlet of the downstream-connected turbo-unit and with a gas outlet or discharge.

As a result of this construction, the inlets are disposed on one side and the outlets on the other side in relation to the shifting element. The necessary connections therefore entail no difficulties.

In an advantageous embodiment of the present invention, the shifting element is constructed threepartite and the center part is rotatable with respect to the stationary forward part and the stationary rear part. Appropriately, the center part may be provided with at least three channels or ducts which extend from one end face to the other and of which two channels are used for the parallel operation which connect the gas inlet of the forward or upstream part with the gas inlet of the rear part and the connection at the gas outlet of the upstream-connected turbo-unit with the gas outlet of the rear part whereas in series operation the third channel or duct establishes the connection to the gas outlet of the upstream-connected turbo-unit with the connection of the rear part to the gas inlet of the downstream-connected turbo unit.

The center part may adjoin with at least two channels directly the gas outlet of the upstream-connected turbo-unit. With this type of construction, the forward, stationary part of the shifting element possesses only one inlet channel as connection to the atmosphere. In order to achieve a good seal of the forward stationary part, the forward fixed part may be axially displaceably supported and may be provided on its end face adjoining the center part with sealing bars.

An embodiment advantageous in particular for a hot gas shifting element which is arranged between the compressor turbine and the output turbine, is obtained if the center rotatable part is supported under interposition of a rotatable supply or feed element for the lubrication and the blocking air. The thermal expansion which necessarily occurs can be controlled by this radial subdivision. In order to enable an exact centering, a multi-spline connection may be provided between the feed element and the center part. It is also advantageous from a constructive point of view if the feed element is supported on the rear part of the shifting element. The support of the center part may thereby simultaneously carry the rear bearing of the upstream-connected turbo-unit. In connection with a hot gas shifting element it is also appropriate if the feed element is provided with labyrinths for the seal with respect to the upstream-connected or input-connected turbo unit. The rear fixed part may additionally include a flange for the support of the second bearing of the input connected turbo-unit.

With a hot gas shifting element the forward stationary part may carry the actuation and bearing elements of an adjustable guide apparatus of the upstream-connected or input-connected turbo-unit.

With a shifting element arranged between two compressors, the forward stationary part may be constructed as compressor stator of an input-connected low-pressure compressor and may be provided with a discharge guide blading. It is thereby also appropriate if the rear bearing support of the low-pressure compressor and the forward bearing support of the center part as well as the associated sealing and lubricating elements are arranged at the forward fixed part. In a structurally advantageous embodiment, the forward stationary part constructed as compressor stator may additionally carry the forward compressor bearing preferably by way of an inlet guide blading with the associated elements for the lubrication and sealing.

Accordingly, it is an object of the present invention to provide a shifting element for gas turbines which effectively eliminates by simple means the aforementioned shortcomings and drawbacks encountered in the prior art.

Another object of the present invention resides in a shifting element for gas turbines for shifting between series and parallel operation which permits a compact design with favorable connections to the preceding and trailing units.

A further object of the present invention resides in a shifting element for gas turbines of the type described above which entails no difficulties as regards its connections while permitting a ready control of thermal expansion and accurate centering of the parts.

These and further objects, features and advantages of the present invention will become more obvious from the following description when taken in connection with the accompanying drawing which shows, for purposes of illustration only, two embodiments in accordance with the present invention, and wherein.

Figure 1:
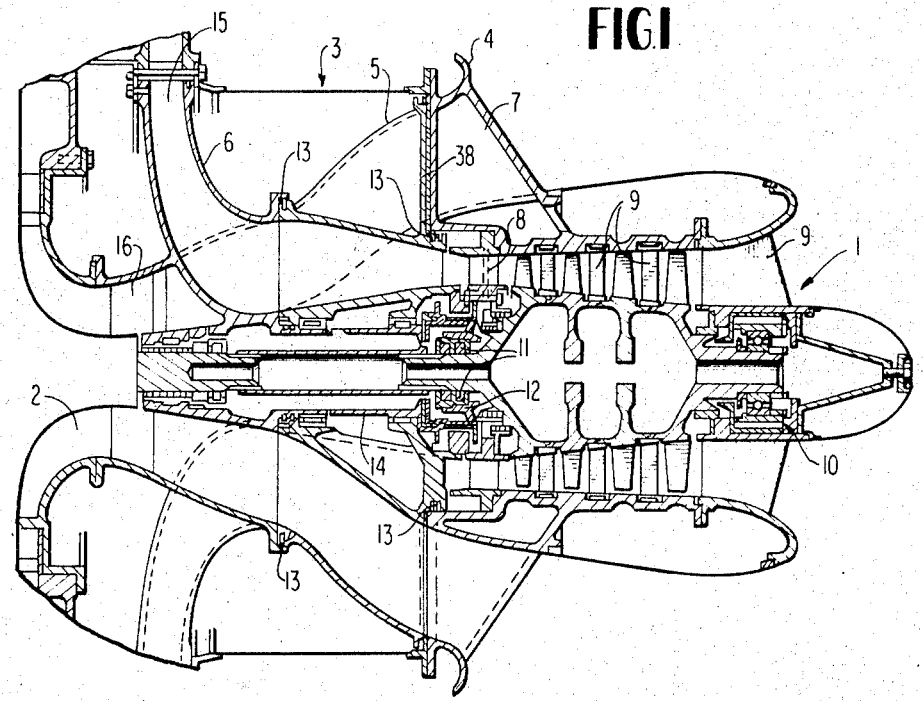
FIG. 1 is a schematic partial axial cross-sectional view through a shifting element according to the present invention arranged in the compressor section of a gas turbine.

Referring now to the drawing wherein like reference numerals are used throughout the various views to designate like parts, and more particularly to FIG. 1, a shifting element generally designated by reference numeral 3 is arranged between the axial low-pressure compressor generally designated by reference numeral 1 and the radial high-pressure compressor 2, indicated only in part. The shifting element 3 which is operable to connect the two compressors 1 and 2 either in parallel or in series, is arranged concentric to the two compressors 1 and 2 and consists of three parts or sections 4, 5 and 6 of which the forward part or section 4 and the rearward part or section 6 are arranged stationary whereas the center part or section 5 is rotatable with respect to the two stationary parts or sections 4 and 6. The forward stationary part 4 is provided with a gas inlet 7 which is in communication with the atmosphere. The forward stationary part 4 is constructed as compressor stator for the low-pressure compressor 1, whence it is extended in the axial direction and includes a discharge guide blading 8 and several inlet guide blades 9. The forward inlet guide blading 9 is thereby so constructed that it carries the forward compressor bearing generally designated by reference numeral 10 inclusive the associated lubricating and sealing elements. In a similar manner, the discharge guide blading 8 carries the rear bearing 11 of the low-pressure compressor 1 and the associated sealing and lubricating elements. Additionally, the bearing support of the center rotatable part 5 is mounted at the flange 12 of the discharge guide blading 8.

The center part 5 of the shifting element 3 is rotatably arranged with respect to the two fixed or stationary parts 4 and 6 and is sealed by means of piston-ring-like sealing bars 13. Additionally, sealing bars disposed in the axial direction and not illustrated in detail may be provided. The center part 5 is provided with at least three channels or ducts which are arranged sector-shaped. It is rotatable by means of an adjusting mechanism (not shown in FIG. 1, however an adjusting mechanism as described below with respect to FIG. 2 could be utilized) by one channel width so that respectively other channels or closures are connected with the corresponding connections. The center part 5 is supported on a bushing 14 rigidly arranged at the rear stationary part 6. The rear stationary part 6 of the shifting element 3 is provided with channels which, on the one hand, lead as gas outlet 15 to a heat-exchanger and, on the other hand, as gas inlet 16 to the high-pressure compressor 2.

The channels or ducts of the three parts 4, 5 and 6 are so constructed that for the shifting position "series operation," the gas discharge or outlet of the low pressure compressor 1 is connected with the gas inlet 16 of the high-pressure compressor 2 whereas all other channels are closed. For the parallel operation, the center part 5 then has to be rotated so that it then connects the gas outlet of the low-pressure compressor 1 with the radially directed outlet 15 of the rear part 6 of the shifting element 3 whereas it simultaneously connects the inlet 7 of the forward part 4 of the shifting element 3 with the gas inlet 16 of the high-pressure compressor 2 which then draws in from the atmosphere.

Figure 2:
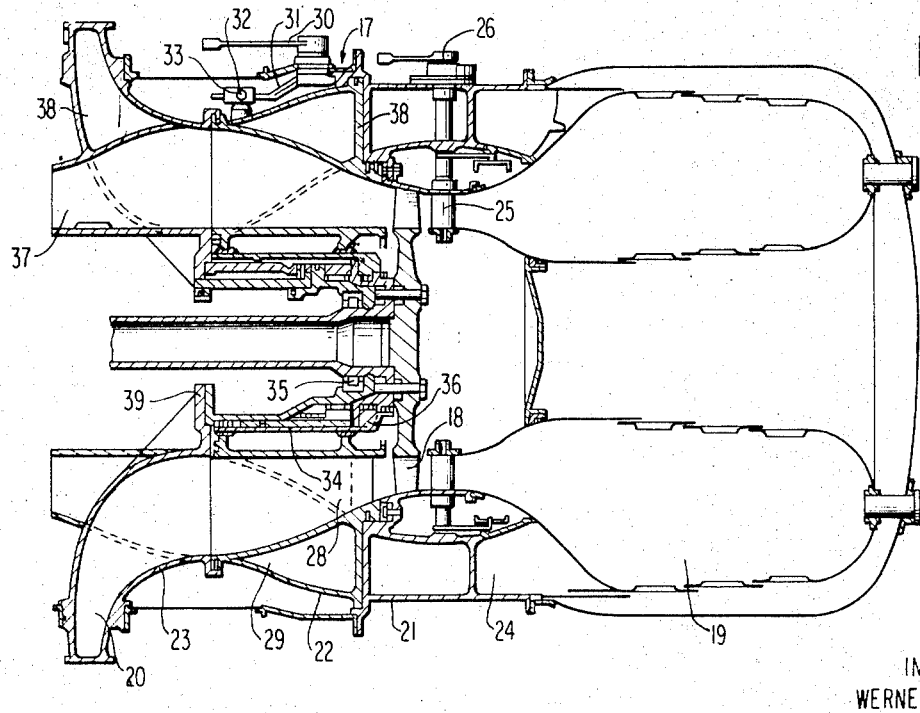
FIG. 2 is a schematic partial axial cross-sectional view through a shifting element in accordance with the present invention arranged in the turbine section of a gas turbine.

FIG. 2 illustrates a further shifting element generally designated by reference numeral 17 which is constructed as hot gas shifting element and is arranged between a compressor turbine 18 and an output or work turbine (not shown) of any conventional construction. A combustion chamber 19 is connected upstream, i.e., to the input of the compressor turbine 18. The shifting element 17 has the task to so establish the gas conduction in the series operation that the hot gases from the combustion chamber 19 flow at first through the compressor turbine 18 and subsequently through the output turbine. For the parallel operation, the possibility has to be provided that the hot gases from the combustion chamber 19 are conducted directly to the output turbine by-passing the compressor turbine 18 whereas simultaneously the hot gases flowing through the compressor turbine 18 are conducted to a heat-exchanger by way of a separate outlet 20.

Figure 3:
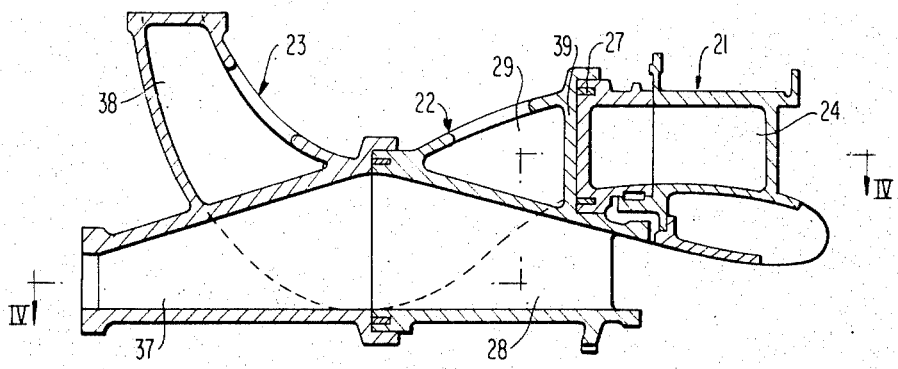
FIG. 3 is a partial cross-sectional view, similar to FIG. 2 and on an enlarged scale, through a shifting element according to the present invention.

The shifting element 17 consists, as in the embodiment of FIG. 1, of three parts or sections 21, 22 and 23 of which the forward part or section 21 and the rearward part or section 23 are constructed stationary whereas the center part or section 22 is rotatable with respect to the two fixed parts or sections 21 and 23. The forward part 21 includes a gas inlet 24 leading to the combustion chamber 19. It additionally carries a guide apparatus 25 of any conventional construction for the compressor turbine 18 inclusive the associated adjusting mechanism 26, also of conventional construction. The forward part 21 of the shifting element 17 can be once more subdivided and, as illustrated in FIG. 3, may be axially movable. It becomes possible thereby to attain a good seal with respect to the center part 22 in that sealing bars 27 are inserted into the end face of the forward part 21 adjoining the same which by reason of the gas pressure in the combustion chamber 19 are pressed against the center part 22. The center part 22 of the shifting element 17 with a channel 28 directly adjoins the outlet or discharge of the compressor turbine 18 and with another channel 29 the gas inlet 24 of the stationary part 21. An adjusting mechanism is provided for the rotatable center part 22 which is actuable by way of an external lever 30 and which surrounds by means of a further lever 32 provided with a fork-like portion 31 a ball head 33 mounted rigidly at the center part 32. The center part 32 is subdivided in the radial direction within the area of its bearing support so that the thermal expansions occurring in a hot gas shifting element can be absorbed. It is connected by way of a multi-spline connection with an inwardly disposed feed element 34 which supplies the bearing support of the center part 22 and the turbine bearing 35 of the compressor turbine 18 with lubricant and with blocking air. The feed element 34 additionally carries a labyrinth seal 36, by means of which it seals the center part 22 with respect to the compressor turbine 18. During a shifting of the center part 22, the labyrinth seal 36 is rotated along, which may under certain circumstances have advantageous effects.

The rear stationary part 23 also is provided with several channels 37 and 38, of which two channels 37 are disposed axially and are adapted to be connected to the gas inlet of the outlet turbine (not shown). The third channel 38 is disposed essentially in a radial direction and serves for the connection with a heat-exchanger (not shown). The stationary part 23 is provided in its interior space with a flange 39 directed toward the center, at which are supported the bearing support of the center part 22 and also the forward bearing 35 of the compressor turbine 18.

Figure 4:
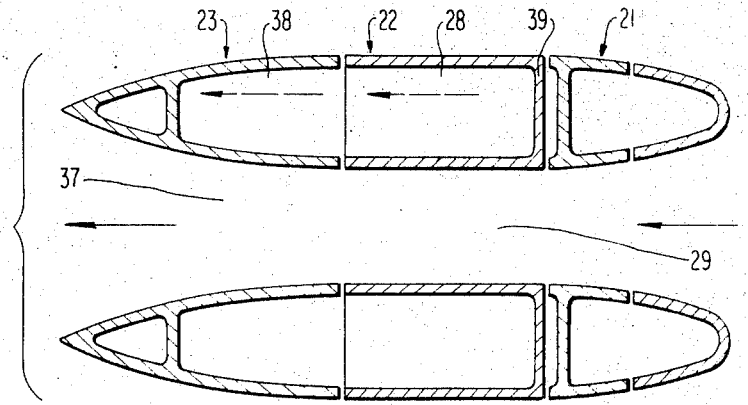
FIG. 4 is a partial cross-sectional view, taken along line IV—IV of FIG. 3 in the first shifting position of the shifting element.
Figure 5:
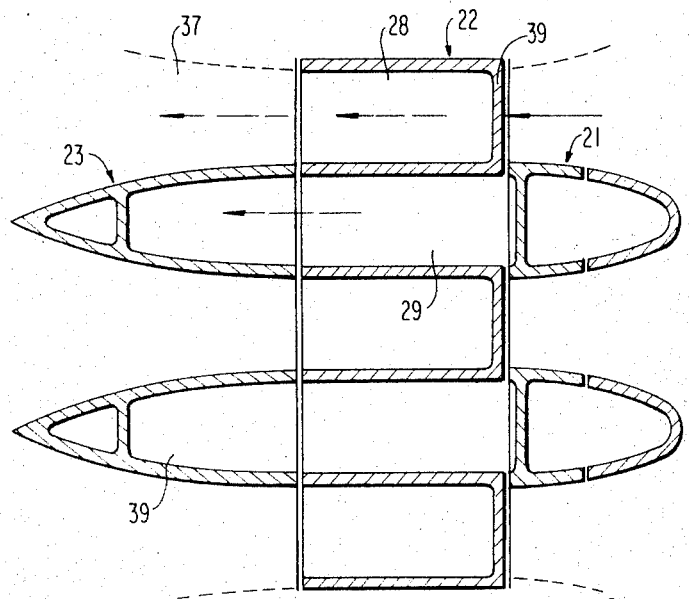
FIG. 5 is a cross-sectional view, taken along line IV—IV of FIG. 3 in another shifting position of the shifting element.

The air guidance or conduction of the shifting element 3 according to FIG. 1 corresponds to the air conduction of the shifting element 17 according to FIGS. 2 and 3 which are illustrated in detail in FIGS. 4 and 5 which represent a partial cross-section unfolded into a plane and taken along line IV—IV in the two different shifting positions. In FIG. 4, the shifting position for parallel operation of the gas turbine is illustrated. The partition walls of the channels, constructed with appropriate streamlining, assure that a direct connection through the channels 29 and 37 from the combustion chamber 19 to the output turbine is established whereas the compressor turbine 18 is not connected with the output turbine but is connected instead by way of the channels 28 and 38 directly with the heat-exchanger. The rotatable center part 22 opens up by way of the channel 29 a communication to the forward stationary part 21 which connects by way of the channel 37 of the rear stationary part 23, the inlet 24 leading to the combustion chamber 19 with the output turbine.

In the shifting position according to FIG. 5, the center part 22 is rotated by the width of a channel. The gas inlet 24 of the forward stationary part is thereby closed with the aid of a closure wall 39 whereas additionally the channel 38 of the rear stationary part 23, which leads to the heat-exchanger is closed with respect to the gas discharge of the compressor turbine 18. All of the hot gases produced in the combustion chamber 19 therefore have to pass first through the compressor turbine 18 and subsequently through the output turbine.

While we have shown and described two embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

For the sake of convenience, the terms "turbo-units" or "turbo-aggregates" are used in the specification and claims herein to refer to both compressors and turbines with which the basic design of the shifting element in accordance with the present invention can be used.

We claim:

1. A shifting element for gas turbines for shifting between series and parallel operation, which is rotatably arranged concentrically between two turbo-units and which is subdivided into channel sectors for the connection of the flow paths of the turbo-units with each other or for the connection of the turbo units with an inlet and an outlet, characterized in that the shifting element consists of at least two mutually rotatable parts arranged one behind the other, of which one part is provided with a gas inlet and a connection to a gas outlet of one turbo-unit while the other part is provided with a connection to a gas inlet of the other turbo-unit and with a gas outlet, characterized in that the shifting element is constructed three-partite, of which a center part is rotatable with respect to stationary forward and rearward parts, and characterized in that the center part is provided with at least three channels which extend substantially from one end face to the other, two of said channels being used for parallel operation and connecting a gas inlet of the forward part with a gas inlet of the rearward part and a gas outlet of the upstream-connected turbo-unit with a gas outlet of the rear part whereas in series operation the third channel connects the gas outlet of the upstream-connected turbo-unit with the connection of the rear part to a gas inlet of the downstream-connected turbo-unit.

2. A shifting element according to claim 1, characterized in that the center part with at least two channels directly adjoins the gas outlet of the upstream-connected turbo-unit.

3. A shifting element according to claim 2, characterized in that the forward stationary part is axially displaceably supported and is provided at the end face thereof adjoining the center part with sealing bar means.

4. A shifting element, especially a hot gas shifting element, according to claim 3, characterized in that the rotatable center part is supported by support means under interposition of a rotatable feed means for lubrication and blocking air.

5. A shifting element according to claim 4, characterized in that a multi-spline connection is provided between the feed means and the center part.

6. A shifting element according to claim 5, characterized in that the feed means is supported on the rear part of the shifting element.

7. A shifting element according to claim 6, characterized in that the support means of the center part simultaneously carries bearing means for the upstream-connected turbo-unit.

8. A shifting element according to claim 7, characterized in that the feed means is provided with labyrinth seal means to provide a seal with respect to the upstream-connected turbo-unit.

9. A shifting element according to claim 8, characterized in that the rear stationary part includes a flange means for the support of a second bearing means of the upstream-connected turbo-unit.

10. A shifting element according to claim 9, characterized in that the forward stationary part carries actuating and bearing means of an adjustable guide blade means for the upstream-connected turbo-unit.

11. A shifting element according to claim 3, characterized in that the forward stationary part is constructed as compressor stator of an upstream-connected low pressure compressor and includes discharge guide blade means.

12. A shifting element according to claim 11, characterized in that a rear bearing means of the low-pressure compressor and a forward bearing means of the center part as well as the associated sealing and lubricating means are arranged at the forward stationary part.

13. A shifting element according to claim 12, characterized in that the forward stationary part constructed as compressor stator carries the forward compressor bearing means.

14. A shifting element according to claim 13, characterized in that the forward stationary part carries said forward compressor bearing means by way of an inlet blading means with associated lubricating and sealing means.

15. A shifting element arrangement for shifting respective gas flow parts of at least two turbo-units of a gas turbine machine between series and parallel operation of the turbo units with respect to one another; said shifting element arrangement comprising:
a first part arranged concentrically around a longitudinal axis of a gas turbine machine and having respective forward and rearward end faces extending substantially perpendicular to said axis,
at least three separate channel means extending through said first part, each of said channel means being open only at said respective forward and rearward end faces,
mounting means for mounting said first part for rotational movement about said axis with respect to a forward turbo-unit positionable forwardly of said forward end face and a rearward turbo-unit positionable rearwardly of said rearward end face, and
rotating means for moving said first part from a first position corresponding to parallel operation of said forward and rearward turbo units with a first of said channels open at the forward face to a gas inlet of said forward turbo-unit and open at the rearward face with a gas inlet of the rearward turbo-unit, and a second of said channels open at the forward face to a gas outlet of said forward turbo-unit and open at the rearward face to a gas outlet to a second position corresponding to series operation of said forward and rearward turbo-units with a third of said channels open at the forward face to a gas outlet of said forward turbo-unit and open at the rearward face to a gas inlet of said rearward turbo-unit.

16. An arrangement according to claim 15, wherein means are provided for blocking gas flow through said third channel when said first part is in said first position and for blocking gas flow through said first and second channels when said first part is in said second position.

17. An arrangement according to claim 15, further comprising a second part arranged forwardly of said first part and having a second rear end face in adjacent facing relationship to said forward face of said first part, said second part being stationary with respect to the gas inlet and gas outlet of said forward turbo-unit and including openings in said second part rear end face for directly communicating said respective gas inlet and gas outlet of said forward turbo-unit with respective channels in said first part.

18. An arrangement according to claim 17, further comprising a third part arranged rearwardly of said first part and having a third part forward end face in adjacent facing relationship to said rearward face of said first part, said third part being stationary with respect to said gas inlet and gas outlet of said rearward turbo-unit and including openings in said third part forward end face directly communicating said respective gas inlet of said rearward turbo-unit and said gas outlet with respective channels in said first part.

19. An arrangement according to claim 15, further comprising a second part arranged forwardly of said first part and a third part arranged rearwardly of said first part and having a third part forward end face in adjacent facing relationship to said rearward face of said first part, said third part being stationary with respect to said gas inlet and gas outlet of said rearward turbo-unit and including openings in said third part forward end face directly communicating said respective gas inlet of said rearward turbo-unit and said gas outlet with respective channels in said first part.

20. An arrangement according to claim 15, characterized in that a support means of the first part simultaneously carries bearing means for the forward turbo-unit.

21. An arrangement according to claim 17, characterized in that the second part is constructed as compressor stator of an upstream-connected low-pressure compressor and includes discharge guide blade means.

22. An arrangement according to claim 21, characterized in that a rear bearing means of the low-pressure compressor and a forward bearing means of the first part as well as the associated sealing and lubricating means are arranged at the second part.

23. An arrangement according to claim 21, characterized in that the second part constructed as compressor stator carries the compressor bearing means.

24. An arrangement according to claim 23, characterized in that the second part carries said compressor bearing means by way of an inlet blading means with associated lubricating and sealing means.

25. An arrangement according to claim 17, characterized in that the second part carries actuating and bearing means of an adjustable guide blade means for the forward turbo-unit.

26. An arrangement according to claim 18, characterized in that the second part is axially displaceably supported and is provided at the rear end face thereof with sealing bar means.

27. An arrangement according to claim 18, characterized in that the rotatable first part is supported by the support means under interposition of a rotatable feed means for lubrication and blocking air.

28. An arrangement according to claim 27, characterized in that a multi-spline connection is provided between the feed means and the first part.

29. An arrangement according to claim 27, characterized in that the feed means is supported on the third part.

30. An arrangement according to claim 27, characterized in that the feed means is provided with labyrinth seal means to provide a seal with respect to the forward turbo-unit.

31. An arrangement according to claim 18, characterized in that a support means of the first part simultaneously carries bearing means for the forward turbo-unit.

32. An arrangement according to claim 31, characterized in that the third part includes a flange means for the support of a second bearing means of the upstream-connected turbo-unit.

* * * * *